US012662149B2

(12) United States Patent
Zhang et al.

(10) Patent No.: US 12,662,149 B2
(45) Date of Patent: Jun. 23, 2026

(54) DETERMINATION OF AN OPTIMAL VEHICLE MANEUVERING PLAN IN A TRAFFIC CONGESTION SITUATION

(71) Applicant: GM Global Technology Operations LLC, Detroit, MI (US)

(72) Inventors: Yuan Zhang, Pudong (CN); Lujia Xu, Shanghai (CN)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 141 days.

(21) Appl. No.: 18/658,058

(22) Filed: May 8, 2024

(65) Prior Publication Data

US 2025/0333071 A1     Oct. 30, 2025

(30) Foreign Application Priority Data

Apr. 28, 2024     (CN) .......................... 202410524190.0

(51) Int. Cl.
*B60W 50/14*          (2020.01)
*B60K 35/23*          (2024.01)
(Continued)

(52) U.S. Cl.
CPC ............. *B60W 50/14* (2013.01); *B60K 35/23* (2024.01); *B60K 35/28* (2024.01); *H04W 4/46* (2018.02); *B60K 2360/166* (2024.01); *B60K 2360/1868* (2024.01); *B60K 2360/5915* (2024.01); *B60W 2050/146* (2013.01); *B60W 2554/406* (2020.02); *B60W 2556/20* (2020.02); *B60W 2556/35* (2020.02); *B60W 2556/65* (2020.02)

(58) Field of Classification Search
CPC ............. B60W 50/14; B60W 2556/20; B60W 2556/65; B60W 2554/406; B60W 2556/35; B60W 2050/146; H04W 4/46; B60K 35/28; B60K 35/23; B60K 2360/5915; B60K 2360/1868; B60K 2360/166

See application file for complete search history.

(56) References Cited

U.S. PATENT DOCUMENTS

| | | | | |
|---|---|---|---|---|
| 5,428,545 A | * | 6/1995 | Maegawa | ........ G08G 1/096827 |
| | | | | 701/414 |
| 7,979,198 B1 | * | 7/2011 | Kim | ....................... G08G 1/091 |
| | | | | 701/117 |

(Continued)

FOREIGN PATENT DOCUMENTS

| | | | | | |
|---|---|---|---|---|---|
| CN | 120260301 A | * | 7/2025 | ............. | G06N 3/042 |
| CN | 120564447 A | * | 8/2025 | ........... | G08G 1/0145 |

(Continued)

*Primary Examiner* — Chico A Foxx
(74) *Attorney, Agent, or Firm* — Vivacqua Crane, PLLC

(57) ABSTRACT

According to several aspects, a method for providing information to an occupant of a vehicle is provided. The method may include identifying a traffic congestion type in an environment surrounding the vehicle. The traffic congestion type is characterized by a traffic congestion characteristic parameter set. The method further may include determining an optimal vehicle maneuvering plan based at least in part on the traffic congestion type and the traffic congestion characteristic parameter set. The method further may include providing a notification to the occupant of the vehicle. The notification is based at least in part on the optimal vehicle maneuvering plan.

15 Claims, 4 Drawing Sheets

(51) Int. Cl.
   *B60K 35/28*      (2024.01)
   *H04W 4/46*      (2018.01)

(56)        References Cited

U.S. PATENT DOCUMENTS

| | | | | |
|---|---|---|---|---|
| 9,596,572 | B2 * | 3/2017 | Wormald | G08G 1/0967 |
| 2015/0032289 | A1 * | 1/2015 | Lotz | H04L 67/12 |
| | | | | 701/1 |
| 2019/0276027 | A1 * | 9/2019 | Toda | B60W 40/04 |
| 2019/0377352 | A1 * | 12/2019 | Weißwange | B60W 60/0027 |
| 2020/0290619 | A1 * | 9/2020 | Mehdi | B60W 40/04 |
| 2021/0248903 | A1 * | 8/2021 | Eilertsen | G08G 1/0112 |
| 2022/0009488 | A1 * | 1/2022 | Li | B60W 40/06 |
| 2023/0115708 | A1 * | 4/2023 | Xiang | G08G 1/16 |
| | | | | 701/23 |
| 2023/0182572 | A1 * | 6/2023 | Fujino | B60K 35/81 |
| | | | | 701/36 |
| 2023/0286535 | A1 * | 9/2023 | Zhao | B60W 60/001 |

| | | | | |
|---|---|---|---|---|
| 2024/0067174 | A1 * | 2/2024 | Adam | B60W 60/0015 |
| 2024/0399870 | A1 * | 12/2024 | Kume | B60K 35/29 |
| 2025/0262931 | A1 * | 8/2025 | Fujino | B60K 35/00 |

FOREIGN PATENT DOCUMENTS

| | | | | | |
|---|---|---|---|---|---|
| DE | 19944075 | C2 | | 1/2002 | |
| DE | 102008003039 | A1 | | 7/2009 | |
| DE | 102008047143 | A1 | | 3/2010 | |
| DE | 102008035944 | A1 | | 4/2010 | |
| DE | 102013014872 | A1 | | 3/2015 | |
| DE | 102015217793 | A1 | | 3/2017 | |
| EP | 1895485 | A1 | * | 3/2008 | G08G 1/0104 |
| JP | 08083399 | A | * | 3/1996 | |
| JP | 2001165685 | A | * | 6/2001 | |
| JP | 3275324 | B2 | * | 4/2002 | |
| JP | 2017165289 | A | * | 9/2017 | B60W 10/04 |
| KR | 102050991 | B1 | * | 12/2019 | B60W 50/14 |
| TR | 201818676 | A2 | * | 3/2019 | |
| WO | WO-2013135535 | A1 | * | 9/2013 | G08G 1/0112 |

* cited by examiner

50

52b

54

52a

60

62b

64

62a

70

72b

74

72a

DETERMINATION OF AN OPTIMAL VEHICLE MANEUVERING PLAN IN A TRAFFIC CONGESTION SITUATION

CROSS-REFERENCE TO RELATED APPLICATIONS

This application claims the benefit of foreign priority under 35 U.S.C. § 119 of Chinese patent application number 2024105241900, filed on Apr. 28, 2024. The contents of this application are incorporated herein by reference in their entirety.

INTRODUCTION

The present disclosure relates to systems and methods for providing information to an occupant of a vehicle.

To increase occupant awareness and convenience, vehicles may be equipped with advanced driver assistance systems (ADAS) and/or automated driving systems (ADS). ADAS systems may use various sensors such as cameras, radar, and LiDAR (light detection and ranging) to detect and identify objects around the vehicle, including other vehicles, pedestrians, road configurations, traffic signs, and road markings. ADAS systems may take actions based on environmental conditions surrounding the vehicle, such as applying brakes or alerting an occupant of the vehicle. ADS systems may use various sensors to detect objects in the environment around the vehicle and control the vehicle to navigate the vehicle through the environment to a predetermined destination. However, current ADAS and ADS systems may not effectively characterize traffic congestion and provide for optimal maneuvering of the vehicle in traffic congestion situations.

Thus, while ADAS and ADS systems and methods achieve their intended purpose, there is a need for a new and improved system and method for characterizing traffic congestion, determining an optimal vehicle maneuvering plan, and providing information about the optimal vehicle maneuvering plan to the occupant(s) of the vehicle.

SUMMARY

According to several aspects, a method for providing information to an occupant of a vehicle is provided. The method may include identifying a traffic congestion type in an environment surrounding the vehicle. The traffic congestion type is characterized by a traffic congestion characteristic parameter set. The method further may include determining an optimal vehicle maneuvering plan based at least in part on the traffic congestion type and the traffic congestion characteristic parameter set. The method further may include providing a notification to the occupant of the vehicle. The notification is based at least in part on the optimal vehicle maneuvering plan.

In another aspect of the present disclosure, identifying the traffic congestion type further may include receiving one or more messages from one or more remote vehicles using a vehicle communication system. Identifying the traffic congestion type further may include determining a plurality of individual speed versus time curves based at least in part on the one or more messages. Each of the plurality of individual speed versus time curves corresponds to one of the one or more remote vehicles. Identifying the traffic congestion type further may include determining the traffic congestion type based at least in part on the plurality of individual speed versus time curves.

In another aspect of the present disclosure, determining the traffic congestion type based at least in part on the plurality of individual speed versus time curves further may include determining a plurality of individual curve characteristic parameter sets. One of the plurality of individual curve characteristic parameter sets describes each of the plurality of individual speed versus time curves. Determining the traffic congestion type based at least in part on the plurality of individual speed versus time curves further may include determining a plurality of individual curve confidence values. Each of the plurality of individual curve confidence values corresponds to one of the plurality of individual curve characteristic parameter sets.

In another aspect of the present disclosure, determining the traffic congestion type based at least in part on the plurality of individual speed versus time curves further may include fusing each of the plurality of individual speed versus time curves into a fused speed versus time curve. Determining the traffic congestion type based at least in part on the plurality of individual speed versus time curves further may include determining a fused curve characteristic parameter set describing the fused speed versus time curve. Determining the traffic congestion type based at least in part on the plurality of individual speed versus time curves further may include determining a fused curve confidence value of the fused curve characteristic parameter set.

In another aspect of the present disclosure, determining the traffic congestion type based at least in part on the plurality of individual speed versus time curves further may include merging each of the plurality of individual speed versus time curves with the fused speed versus time curve to generate a merged speed versus time curve. The merged speed versus time curve is generated based at least in part on the plurality of individual curve characteristic parameter sets, the plurality of individual curve confidence values, the fused curve characteristic parameter set, and the fused curve confidence value. Determining the traffic congestion type based at least in part on the plurality of individual speed versus time curves further may include determining the traffic congestion characteristic parameter set describing the merged speed versus time curve. Determining the traffic congestion type based at least in part on the plurality of individual speed versus time curves further may include determining the traffic congestion type based at least in part on the merged speed versus time curve and the traffic congestion characteristic parameter set.

In another aspect of the present disclosure, determining the traffic congestion type based at least in part on the merged speed versus time curve and the traffic congestion characteristic parameter set further may include performing one or more perception measurements of the one or more remote vehicles using one or more perception sensors of the vehicle. Determining the traffic congestion type based at least in part on the merged speed versus time curve and the traffic congestion characteristic parameter set further may include verifying the traffic congestion type based at least in part on the one or more perception measurements.

In another aspect of the present disclosure, determining the optimal vehicle maneuvering plan further may include selecting a selected machine learning maneuvering model from a plurality of maneuvering models. The selected maneuvering model corresponds to the traffic congestion type. Determining the optimal vehicle maneuvering plan further may include determining the optimal vehicle maneuvering plan using the selected machine learning maneuvering model. The selected machine learning maneuvering model is configured to receive the traffic congestion characteristic parameter set as an input and provide the optimal vehicle maneuvering plan as an output.

In another aspect of the present disclosure, determining the optimal vehicle maneuvering plan further may include determining the optimal vehicle maneuvering plan using the selected machine learning maneuvering model. The selected machine learning maneuvering model is configured to receive the traffic congestion characteristic parameter set as an input and provide the optimal vehicle maneuvering plan as an output. The optimal vehicle maneuvering plan includes an optimal speed versus time curve.

In another aspect of the present disclosure, providing the notification further may include determining one or more optimal acceleration and braking levels based at least in part on the optimal speed versus time curve. Providing the notification further may include providing the notification to the occupant of the vehicle. The notification includes at least one of: the optimal speed versus time curve and the one or more optimal acceleration and braking levels.

In another aspect of the present disclosure, providing the notification further may include determining a recommended vehicle maneuver based at least in part on the traffic congestion type. Providing the notification further may include providing the notification to the occupant of the vehicle. The notification includes the recommended vehicle maneuver.

According to several aspects, a system for providing information to an occupant of a vehicle is provided. The system may include a vehicle communication system, a display, and a controller in electrical communication with the vehicle communication system and the display. The controller is programmed to identify a traffic congestion type in an environment surrounding the vehicle using the vehicle communication system. The traffic congestion type is characterized by a traffic congestion characteristic parameter set. The controller is further programmed to determine an optimal vehicle maneuvering plan based at least in part on the traffic congestion type and the traffic congestion characteristic parameter set. The controller is further programmed to provide a notification to the occupant of the vehicle using the display. The notification is based at least in part on the optimal vehicle maneuvering plan.

In another aspect of the present disclosure, to identify the traffic congestion type, the controller is further programmed to receive one or more messages from one or more remote vehicles using the vehicle communication system. To identify the traffic congestion type, the controller is further programmed to determine a plurality of individual speed versus time curves based at least in part on the one or more messages. Each of the plurality of individual speed versus time curves corresponds to one of the one or more remote vehicles. To identify the traffic congestion type, the controller is further programmed to determine the traffic congestion type based at least in part on the plurality of individual speed versus time curves.

In another aspect of the present disclosure, to determine the traffic congestion type based at least in part on the plurality of individual speed versus time curves, the controller is further programmed to determine a plurality of individual curve characteristic parameter sets. One of the plurality of individual curve characteristic parameter sets describes each of the plurality of individual speed versus time curves. To determine the traffic congestion type based at least in part on the plurality of individual speed versus time curves, the controller is further programmed to determine a plurality of individual curve confidence values. Each of the plurality of individual curve confidence values corresponds to one of the plurality of individual curve characteristic parameter sets. To determine the traffic congestion type based at least in part on the plurality of individual speed versus time curves, the controller is further programmed to fuse each of the plurality of individual speed versus time curves into a fused speed versus time curve. To determine the traffic congestion type based at least in part on the plurality of individual speed versus time curves, the controller is further programmed to determine a fused curve characteristic parameter set describing the fused speed versus time curve. To determine the traffic congestion type based at least in part on the plurality of individual speed versus time curves, the controller is further programmed to determine a fused curve confidence value of the fused curve characteristic parameter set. To determine the traffic congestion type based at least in part on the plurality of individual speed versus time curves, the controller is further programmed to merge each of the plurality of individual speed versus time curves with the fused speed versus time curve to generate a merged speed versus time curve. The merged speed versus time curve is generated based at least in part on the plurality of individual curve characteristic parameter sets, the plurality of individual curve confidence values, the fused curve characteristic parameter set, and the fused curve confidence value. To determine the traffic congestion type based at least in part on the plurality of individual speed versus time curves, the controller is further programmed to determine the traffic congestion characteristic parameter set describing the merged speed versus time curve. To determine the traffic congestion type based at least in part on the plurality of individual speed versus time curves, the controller is further programmed to determine the traffic congestion type based at least in part on the merged speed versus time curve and the traffic congestion characteristic parameter set.

In another aspect of the present disclosure, the system further includes one or more perception sensors in electrical communication with the controller. To determine the traffic congestion type based at least in part on the merged speed versus time curve and the traffic congestion characteristic parameter set, the controller is further programmed to perform one or more perception measurements of the one or more remote vehicles using the one or more perception sensors. To determine the traffic congestion type based at least in part on the merged speed versus time curve and the traffic congestion characteristic parameter set, the controller is further programmed to verify the traffic congestion type based at least in part on the one or more perception measurements.

In another aspect of the present disclosure, to determine the optimal vehicle maneuvering plan, the controller is further programmed to select a selected machine learning maneuvering model from a plurality of maneuvering models. The selected machine learning maneuvering model corresponds to the traffic congestion type. To determine the optimal vehicle maneuvering plan, the controller is further programmed to determine the optimal vehicle maneuvering plan using the selected machine learning maneuvering model. The selected machine learning maneuvering model is configured to receive the traffic congestion characteristic parameter set as an input and provide the optimal vehicle maneuvering plan as an output. The optimal vehicle maneuvering plan includes an optimal speed versus time curve.

In another aspect of the present disclosure, to provide the notification, the controller is further programmed to determine one or more optimal acceleration and braking levels based at least in part on the optimal speed versus time curve.

To provide the notification, the controller is further programmed to provide the notification to the occupant of the vehicle using the display. The notification includes at least one of: the optimal speed versus time curve and the one or more optimal acceleration and braking levels.

In another aspect of the present disclosure, the display further may include a head-up display (HUD) in electrical communication with the controller. To provide the notification, the controller is further programmed to provide the notification to the occupant of the vehicle using the HUD. The notification includes at least one of: the optimal speed versus time curve and the one or more optimal acceleration and braking levels.

According to several aspects, a method for providing information to an occupant of a vehicle is provided. The method may include receiving one or more messages from one or more remote vehicles using a vehicle communication system. The method further may include determining a plurality of individual speed versus time curves based at least in part on the one or more messages. Each of the plurality of individual speed versus time curves corresponds to one of the one or more remote vehicles. The method further may include determining a traffic congestion type based at least in part on the plurality of individual speed versus time curves. The traffic congestion type is characterized by a traffic congestion characteristic parameter set. The method further may include determining an optimal vehicle maneuvering plan based at least in part on the traffic congestion type and the traffic congestion characteristic parameter set. The optimal vehicle maneuvering plan includes at least an optimal speed versus time curve. The method further may include determining one or more optimal acceleration and braking levels based at least in part on the optimal speed versus time curve. The method further may include providing a notification to the occupant of the vehicle using a head-up display (HUD). The notification includes at least one of: the optimal speed versus time curve and the one or more optimal acceleration and braking levels.

In another aspect of the present disclosure, determining the traffic congestion type based at least in part on the plurality of individual speed versus time curves further may include determining a plurality of individual curve characteristic parameter sets. One of the plurality of individual curve characteristic parameter sets describes each of the plurality of individual speed versus time curves. Determining the traffic congestion type based at least in part on the plurality of individual speed versus time curves further may include determining a plurality of individual curve confidence values. Each of the plurality of individual curve confidence values corresponds to one of the plurality of individual curve characteristic parameter sets. Determining the traffic congestion type based at least in part on the plurality of individual speed versus time curves further may include fusing each of the plurality of individual speed versus time curves into a fused speed versus time curve. Determining the traffic congestion type based at least in part on the plurality of individual speed versus time curves further may include determining a fused curve characteristic parameter set describing the fused speed versus time curve. Determining the traffic congestion type based at least in part on the plurality of individual speed versus time curves further may include determining a fused curve confidence value of the fused curve characteristic parameter set. Determining the traffic congestion type based at least in part on the plurality of individual speed versus time curves further may include merging each of the plurality of individual speed versus time curves with the fused speed versus time curve to generate a merged speed versus time curve. The merged speed versus time curve is generated based at least in part on the plurality of individual curve characteristic parameter sets, the plurality of individual curve confidence values, the fused curve characteristic parameter set, and the fused curve confidence value. Determining the traffic congestion type based at least in part on the plurality of individual speed versus time curves further may include determining the traffic congestion characteristic parameter set describing the merged speed versus time curve. Determining the traffic congestion type based at least in part on the plurality of individual speed versus time curves further may include determining the traffic congestion type based at least in part on the merged speed versus time curve and the traffic congestion characteristic parameter set.

In another aspect of the present disclosure, determining the optimal vehicle maneuvering plan further may include selecting a selected machine learning maneuvering model from a plurality of maneuvering models. The selected maneuvering model corresponds to the traffic congestion type. Determining the optimal vehicle maneuvering plan further may include determining the optimal vehicle maneuvering plan using the selected machine learning maneuvering model. The selected machine learning maneuvering model is configured to receive the traffic congestion characteristic parameter set as an input and provide the optimal vehicle maneuvering plan as an output. The optimal vehicle maneuvering plan includes an optimal speed versus time curve.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Traffic congestion situations may cause discomfort for vehicle occupants. Furthermore, vehicle occupants may be unsure of the optimal actions or vehicle maneuvers (e.g., acceleration, braking, changing lanes, etc.) to increase comfort and promote forward progress of the vehicle in traffic congestion situations. Therefore, the present disclosure provides a new and improved system and method for characterizing traffic congestion, determining an optimal vehicle maneuvering plan, and providing information about the optimal vehicle maneuvering plan to the occupant(s) of the vehicle.

Figures 1, 2:
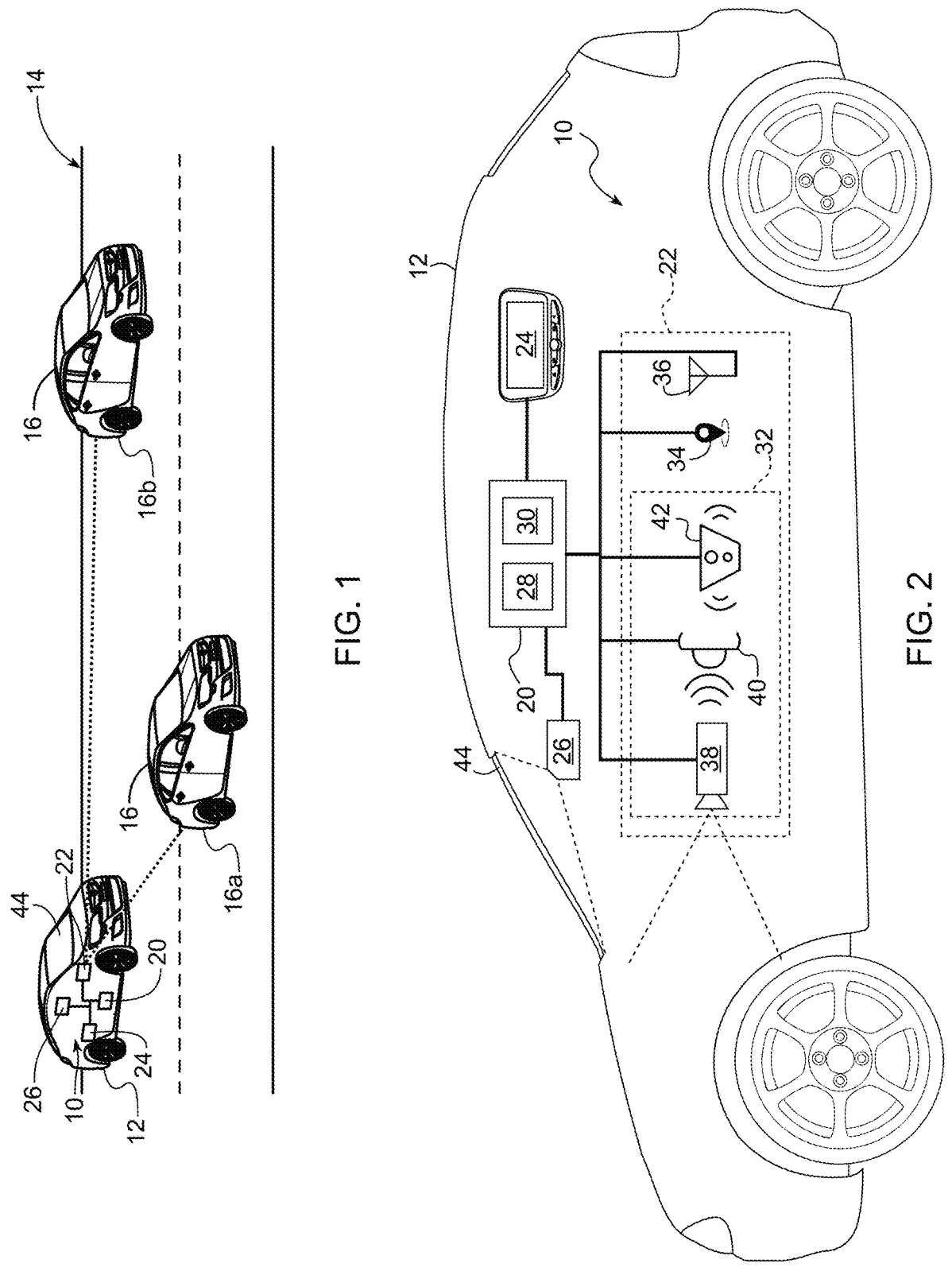
FIG. 1 is a schematic diagram of a system for providing information to an occupant of a vehicle shown with a host vehicle in an exemplary context of a roadway including one or more remote vehicles, according to an exemplary embodiment.
FIG. 2 is a schematic diagram of the system for providing information to an occupant of a vehicle, according to an exemplary embodiment.

Referring to FIG. 1, a system 10 for providing information to an occupant of a vehicle is shown with a host vehicle 12 in an exemplary context of a roadway 14 including one or more remote vehicles 16. It should be understood that the roadway 14 may include any open way for passage and transportation of vehicles (e.g., roads, streets, highways, expressways, freeways, boulevards, avenues, parkways, alleys, bridges, tunnels, and/or the like). In the exemplary embodiment shown in FIG. 1, the one or more remote vehicles 16 includes a first remote vehicle 16a and a second remote vehicle 16b. It should be understood that the one or more remote vehicles 16 may include any number of vehicles occupying the roadway 14. The one or more remote vehicles 16 may include, for example, sport utility vehicles (SUVs), sedans, compact cars, trucks, utility vehicles, and/or the like. In some examples, the one or more remote vehicles 16 may further include additional roadway users, such as, for example, pedestrians, bicycles, and/or the like.

Referring to FIG. 2, a schematic diagram of the system 10 for providing information to an occupant of a vehicle is provided. The system 10 is shown with the host vehicle 12. While a passenger vehicle is illustrated, it should be appreciated that the host vehicle 12 may be any type of vehicle without departing from the scope of the present disclosure. The system 10 generally includes a controller 20, a plurality of vehicle sensors 22, a human-machine interface (HMI) 24, and a head-up display (HUD) 26.

The controller 20 is used to implement a method 100 for providing information to an occupant of a vehicle, as will be described below. The controller 20 includes at least one processor 28 and a non-transitory computer readable storage device or media 30. The processor 28 may be a custom made or commercially available processor, a central processing unit (CPU), a graphics processing unit (GPU), an auxiliary processor among several processors associated with the controller 20, a semiconductor-based microprocessor (in the form of a microchip or chip set), a macroprocessor, a combination thereof, or generally a device for executing instructions.

The computer readable storage device or media 30 may include volatile and nonvolatile storage in read-only memory (ROM), random-access memory (RAM), and keep-alive memory (KAM), for example. KAM is a persistent or non-volatile memory that may be used to store various operating variables while the processor 28 is powered down. The computer-readable storage device or media 30 may be implemented using a number of memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions, used by the controller 20 to control various systems of the host vehicle 12.

The controller 20 may also consist of multiple controllers which are in electrical communication with each other. The controller 20 may be inter-connected with additional systems and/or controllers of the host vehicle 12, allowing the controller 20 to access data such as, for example, speed, acceleration, braking, and steering angle of the host vehicle 12.

The controller 20 is in electrical communication with the plurality of vehicle sensors 22, the HMI 24, and the HUD 26. In an exemplary embodiment, the electrical communication is established using, for example, a CAN network, a FLEXRAY network, a local area network (e.g., WiFi, ethernet, and the like), a serial peripheral interface (SPI) network, or the like. It should be understood that various additional wired and wireless techniques and communication protocols for communicating with the controller 20 are within the scope of the present disclosure. It should be understood that one or more of the plurality of vehicle sensors 22, the HMI 24, and the HUD 26 may be integrated with the controller 20 (e.g., on a same circuit board with the controller 20 or otherwise a part of the controller 20) without departing from the scope of the present disclosure. It should further be understood that, in the scope of the present disclosure, electrical communication also includes power and/or energy transfer between electrical devices (e.g., using conducting wires and/or wireless power transmission techniques).

The plurality of vehicle sensors 22 is used to acquire information about the one or more remote vehicles 16. In an exemplary embodiment, the plurality of vehicle sensors 22 includes one or more perception sensors 32, a global navigation satellite system (GNSS) 34, and a vehicle communication system 36.

The one or more perception sensors 32 are used to perceive objects and/or measure distances in the environment surrounding the host vehicle 12. In an exemplary embodiment, the one or more perception sensors 32 includes at least one of: a camera 38, a radar sensor 40, and a light detection and ranging (LiDAR) sensor 42.

The camera 38 is a perception sensor used to capture images and/or videos of the environment surrounding the host vehicle 12. In an exemplary embodiment, the camera 38 includes a photo and/or video camera which is positioned to view the environment surrounding the host vehicle 12. In a non-limiting example, the camera 38 includes a camera affixed inside of the host vehicle 12, for example, in a headliner of the host vehicle 12, having a view through a windscreen 44 of the host vehicle 12. In another non-limiting example, the camera 38 includes a camera affixed outside of the host vehicle 12, for example, on a roof of the host vehicle 12, having a view of the environment in front of the host vehicle 12.

In another exemplary embodiment, the camera 38 is a surround view camera system including a plurality of cameras (also known as satellite cameras) arranged to provide a view of the environment adjacent to all sides of the host vehicle 12. In a non-limiting example, the camera 38 includes a front-facing camera (mounted, for example, in a front grille of the host vehicle 12), a rear-facing camera (mounted, for example, on a rear tailgate of the host vehicle 12), and two side-facing cameras (mounted, for example, under each of two side-view mirrors of the host vehicle 12). In another non-limiting example, the camera 38 further includes an additional rear-view camera mounted near a center high mounted stop lamp of the host vehicle 12.

It should be understood that camera systems having additional cameras and/or additional mounting locations are within the scope of the present disclosure. It should further be understood that cameras having various sensor types including, for example, charge-coupled device (CCD) sensors, complementary metal oxide semiconductor (CMOS) sensors, and/or high dynamic range (HDR) sensors are within the scope of the present disclosure. Furthermore, cameras having various lens types including, for example, wide-angle lenses and/or narrow-angle lenses are also within the scope of the present disclosure. The camera 38 is in electrical communication with the controller 20, as discussed above.

The radar sensor 40 is used to detect and measure the distance, speed, and direction of objects (e.g., the one or more remote vehicles 16) by emitting radio waves and analyzing reflections of the radio waves. In an exemplary embodiment, the radar sensor 40 includes a radar transmitter (not shown), a radar antenna (not shown), a radar receiver (not shown), and a radar signal processing unit (not shown). In a non-limiting example, the radar transmitter emits radio frequency (RF) signals using the radar antenna, which travel through space until they encounter an object. The RF signals bounce off the object's surface and return to the radar sensor 40. The radar receiver captures the reflected signals using the radar antenna, and the radar signal processing unit analyzes the time delay, frequency shift, and amplitude of the returned RF signals to determine the distance, speed, and direction of the detected objects. The radar sensor 40 is in electrical communication with the controller 20, as discussed above.

The LiDAR sensor 42 is utilized for remote sensing and environmental mapping by emitting laser pulses and measuring the time it takes for the laser pulses to return to the LiDAR sensor 42 after hitting objects. In an exemplary embodiment, the LiDAR sensor 42 includes a LiDAR laser source (not shown), a LIDAR scanner or mirror (not shown), a LIDAR photodetector (not shown), and a LiDAR time-of-flight measurement system (not shown). In a non-limiting example, the LiDAR laser source emits laser pulses that travel to the target area, and the LiDAR scanner directs these pulses in different directions. The emitted laser pulses interact with objects in the environment and their reflections are captured by the LiDAR photodetector. The LiDAR time-of-flight measurement system calculates the distance to the objects based on the time between emission of the laser pulses by the LiDAR laser source and reception of the reflected laser pulses by the LiDAR photodetector. The LiDAR sensor 42 is in electrical communication with the controller 20, as discussed above.

In an exemplary embodiment, the one or more perception sensors 32 are affixed inside of the host vehicle 12, for example, in a headliner of the host vehicle 12, having a view through the windscreen 44 of the host vehicle 12. In another example, the one or more perception sensors 32 are affixed outside of the host vehicle 12, for example, on a roof of the host vehicle 12, having a view of the environment surrounding the host vehicle 12. It should be understood that various additional types of perception sensors, such as, for example, stereoscopic cameras having distance measurement capabilities, ultrasonic ranging sensors, and time-of-flight sensors are within the scope of the present disclosure. The one or more perception sensors 32 are in electrical communication with the controller 20 as discussed above.

The GNSS 34 is used to determine a geographical location of the host vehicle 12. In an exemplary embodiment, the GNSS 34 is a global positioning system (GPS). In a non-limiting example, the GPS includes a GPS receiver antenna (not shown) and a GPS controller (not shown) in electrical communication with the GPS receiver antenna. The GPS receiver antenna receives signals from a plurality of satellites, and the GPS controller calculates the geographical location of the host vehicle 12 based on the signals received by the GPS receiver antenna.

In an exemplary embodiment, the GNSS 34 additionally includes a map. The map includes information about infrastructure such as municipality borders, roadways, railways, sidewalks, buildings, and the like. Therefore, the geographical location of the host vehicle 12 is contextualized using the map information. In a non-limiting example, the map is retrieved from a remote source using a wireless connection. In another non-limiting example, the map is stored in a database or memory of the GNSS 34.

It should be understood that various additional types of satellite-based radionavigation systems, such as, for example, the Global Positioning System (GPS), Galileo, GLONASS, and the BeiDou Navigation Satellite System (BDS) are within the scope of the present disclosure. The GNSS 34 is in electrical communication with the controller 20 as discussed above.

The vehicle communication system 36 is used by the controller 20 to communicate with other systems external to the host vehicle 12. For example, the vehicle communication system 36 includes capabilities for communication with vehicles ("V2V" communication), infrastructure ("V2I" communication), remote systems at a remote call center (e.g., ON-STAR by GENERAL MOTORS) and/or personal devices. In general, the term vehicle-to-everything communication ("V2X" communication) refers to communication between the host vehicle 12 and any remote system (e.g., vehicles, infrastructure, and/or remote systems).

In certain embodiments, the vehicle communication system 36 is a wireless communication system configured to communicate via a wireless local area network (WLAN) using IEEE 802.11 standards or by using cellular data communication (e.g., using GSMA standards, such as, for example, SGP.02, SGP.22, SGP.32, and the like). Accordingly, the vehicle communication system 36 may further include an embedded universal integrated circuit card (eUICC) configured to store at least one cellular connectivity configuration profile, for example, an embedded subscriber identity module (eSIM) profile.

The vehicle communication system 36 is further configured to communicate via a personal area network (e.g., BLUETOOTH), near-field communication (NFC), and/or any additional type of radiofrequency communication. However, additional or alternate communication methods, such as a dedicated short-range communications (DSRC) channel and/or mobile telecommunications protocols based on the 3rd Generation Partnership Project (3GPP) standards, are also considered within the scope of the present disclosure. DSRC channels refer to one-way or two-way short-range to medium-range wireless communication channels specifically designed for automotive use and a corresponding set of protocols and standards. The 3GPP refers to a partnership between several standards organizations which develop protocols and standards for mobile telecommunications. 3GPP standards are structured as "releases". Thus, communication methods based on 3GPP release 14, 15, 16 and/or future 3GPP releases are considered within the scope of the present disclosure.

Accordingly, the vehicle communication system 36 may include one or more antennas and/or communication transceivers (not shown) for receiving and/or transmitting signals, such as cooperative sensing messages (CSMs). The vehicle communication system 36 is configured to wirelessly communicate information between the host vehicle 12 and another vehicle. Further, the vehicle communication system 36 is configured to wirelessly communicate information between the host vehicle 12 and infrastructure or other vehicles (e.g., the one or more remote vehicles 16).

In another exemplary embodiment, the plurality of vehicle sensors 22 further includes sensors to determine performance data about the host vehicle 12. In a non-limiting example, the plurality of vehicle sensors 22 further includes at least one of a motor speed sensor, a motor torque sensor, an electric drive motor voltage and/or current sensor, an accelerator pedal position sensor, a brake position sensor, a coolant temperature sensor, a cooling fan speed sensor, and a transmission oil temperature sensor.

In another exemplary embodiment, the plurality of vehicle sensors 22 further includes additional sensors to determine information about an environment within the host vehicle 12. In a non-limiting example, the plurality of vehicle sensors 22 further includes at least one of a seat occupancy sensor, a cabin air temperature sensor, a cabin motion detection sensor, a cabin camera, a cabin microphone, an occupant eye tracker, and/or the like.

In another exemplary embodiment, the plurality of vehicle sensors 22 further includes additional sensors to determine information about an environment surrounding the host vehicle 12. In a non-limiting example, the plurality of vehicle sensors 22 further includes at least one of an ambient air temperature sensor, a barometric pressure sensor, and/or the like. The plurality of vehicle sensors 22 are in electrical communication with the controller 20 as discussed above.

The HMI 24 is used to provide information to an occupant of the host vehicle 12. In the scope of the present disclosure, the occupant includes a driver and/or a passenger of the host vehicle 12. In the exemplary embodiment depicted in FIG. 2, the HMI 24 is a display (e.g., part of an infotainment system of the host vehicle 12) located in view of the occupant and capable of displaying text, graphics and/or images. It is to be understood that HMI display systems including LCD displays, LED displays, and the like are within the scope of the present disclosure. Further exemplary embodiments where the HMI 24 is disposed in a rearview mirror are also within the scope of the present disclosure. In an exemplary embodiment, the occupant may interact with the HMI 24 using a human-interface device (HID), including, for example, a touchscreen, an electromechanical switch, a capacitive switch, a rotary knob, a microphone for receiving voice commands, and the like. It should be understood that additional systems for displaying information to the occupant of the host vehicle 12 are also within the scope of the present disclosure. The HMI 24 is in electrical communication with the controller 20 as discussed above.

The HUD 26 is used to provide information to the occupant of the host vehicle 12. In an exemplary embodiment, the HUD 26 is configured to provide information to the occupant by projecting text, graphics, and/or images upon the windscreen 44 of the host vehicle 12. In a non-limiting example, the HUD 26 includes a projector (not shown) which is used by the controller 20 to project the text, graphics, and/or images upon the windscreen 44 of the host vehicle 12. The text, graphics, and/or images are reflected by the windscreen 44 of the host vehicle 12 and are visible to the occupant without looking away from the roadway 14 ahead of the host vehicle 12. It should be understood that various types of head-up display devices, including, for example, augmented reality head-up display (AR-HUD) devices are within the scope of the present disclosure. In an exemplary embodiment, the occupant may interact with the HUD 26 using a human-interface device (HID), including, for example, a touchscreen, an electromechanical switch, a capacitive switch, a rotary knob, a microphone for receiving voice commands, and the like. It should be understood that additional systems for displaying information to the occupant of the host vehicle 12 are also within the scope of the present disclosure. The HUD 26 is in electrical communication with the controller 20 as discussed above.

Figure 3:
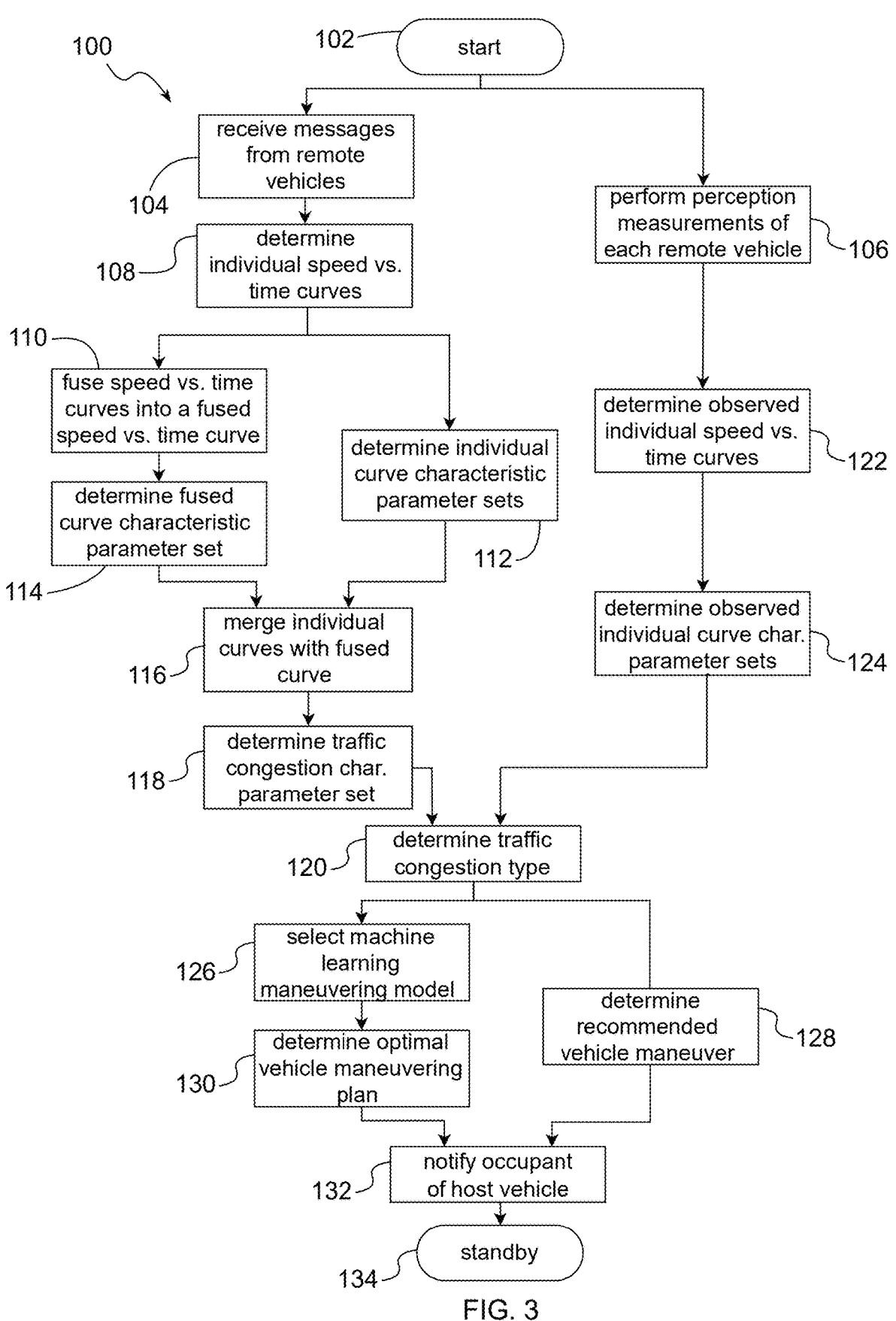
FIG. 3 is a flowchart of a method for providing information to an occupant of a vehicle, according to an exemplary embodiment.

Referring to FIG. 3, a flowchart of the method 100 for providing information to an occupant of a vehicle is shown. The method 100 begins at block 102 and proceeds to blocks 104 and 106. At block 104, the controller 20 uses the vehicle communication system 36 to receive one or more messages from the one or more remote vehicles 16. The one or more messages include at least a speed, position, vehicle identifier (e.g., vehicle identification number (VIN), and/or other temporary identifier based on society of automotive engineers (SAE) messaging standards) and message time for each of the one or more remote vehicles 16. In an exemplary embodiment, the one or more messages are basic safety messages (BSM) from each of the one or more remote vehicles 16 including information such as, for example, a position, speed, speed history over time, acceleration, heading, vehicle type, vehicle identifier, vehicle dimensions, vehicle status, driver intention, message time, and/or the like. In a non-limiting example, the one or more messages are transmitted using vehicle-to-vehicle (V2V) communication techniques, such as, for example, dedicated short-range communications (DSRC). In another non-limiting example, the messages are relayed through one or more central servers (e.g., transmission over the internet or using cellular data communications). After block 104, the method 100 proceeds to block 108.

At block 108, the controller 20 determines a plurality of individual speed versus time curves. In the scope of the present disclosure, a speed versus time curve is a set of data points which represent a speed of a vehicle over a time period (e.g., ten minutes). In a non-limiting example, the speed versus time curve includes speed measurements taken every second over the ten-minute time period. The speed versus time curve may be represented visually on a two-dimensional graph, with time on the horizontal axis (e.g., x-axis) and speed on the vertical axis (e.g., y-axis). Each of the plurality of individual speed versus time curves corresponds to one of the one or more remote vehicles 16. Therefore, each of the plurality of individual speed versus time curves includes speed data for one of the one or more remote vehicles 16. In an exemplary embodiment, to determine the plurality of individual speed versus time curves, the controller 20 aggregates the one or more messages received at block 104 and extracts the speed and time data from the one or more messages received at block 104 for each of the one or more remote vehicles 16. After block 108, the method 100 proceeds to blocks 110 and 112.

At block 110, the controller 20 fuses each of the plurality of individual speed versus time curves determined at block 108 into a single fused speed versus time curve. In an exemplary embodiment, to fuse each of the plurality of individual speed versus time curves into the fused speed versus time curve, the controller 20 first aligns each of the plurality of individual speed versus time curves. The controller 20 then averages each of the plurality of individual speed versus time curves to generate the fused speed versus time curve. It should be understood that additional methods for fusing the plurality of individual speed versus time curves, including, for example, additional mathematical or statistical methods, machine learning based methods, and/or the like are within the scope of the present disclosure. After block 110, the method 100 proceeds to block 114.

At block 114, the controller 20 determines a fused curve characteristic parameter set describing the fused speed versus time curve determined at block 110. In the scope of the present disclosure, the fused curve characteristic parameter set includes parameter values which characterize the shape of the fused speed versus time curve. In an exemplary embodiment, the fused speed versus time curve is fit using a regression or curve fitting algorithm (e.g., a linear, polynomial, exponential, or logarithmic curve fitting algorithm) which generates the fused curve characteristic parameter set. In a non-limiting example, the curve fitting algorithm uses an iterative process to determine optimal values for the fused curve characteristic parameter set. In a non-limiting example, the fused curve characteristic parameter set includes a maximum speed, a minimum speed, a maximum acceleration, a minimum acceleration, one or more coefficients for a mathematical equation describing a curve fit, and/or the like. The fused curve characteristic parameter set may be used to estimate or predict past or future values of the fused speed versus time curve.

The controller 20 also determines a fused curve confidence value of the fused curve characteristic parameter set. In the scope of the present disclosure, the fused curve confidence value quantifies how accurately the fused curve characteristic parameter set describes the fused speed versus time curve. In an exemplary embodiment, the fused curve confidence value is a proportion of the points predicted by the fused curve characteristic parameter set which fall on the fused speed versus time curve. In another exemplary embodiment, the fused curve confidence value is a coefficient of determination ($R^2$) value. It should be understood that the fused curve confidence value may include any value which quantifies how accurately the fused curve characteristic parameter set describes the fused speed versus time curve without departing from the scope of the present disclosure. After block 114, the method 100 proceeds to block 116, as will be discussed in greater detail below.

At block 112, the controller 20 determines a plurality of individual curve characteristic parameter sets. One of the plurality of individual curve characteristic parameter sets describes each of the plurality of individual speed versus time curves determined at block 108. In the scope of the present disclosure, each individual curve characteristic parameter set includes parameter values which characterize the shape of one of the plurality of individual speed versus time curves. In an exemplary embodiment, each of the plurality of individual speed versus time curves are fit using a regression or curve fitting algorithm (e.g., a linear, polynomial, exponential, or logarithmic curve fitting algorithm) which generates an individual curve characteristic parameter set. In a non-limiting example, the curve fitting algorithm uses an iterative process to determine optimal values for each of the plurality of individual curve characteristic parameter sets. In a non-limiting example, each of the plurality of individual curve characteristic parameter sets include a maximum speed, a minimum speed, a maximum acceleration, a minimum acceleration, one or more coefficients for a mathematical equation describing a curve fit, and/or the like. The plurality of individual curve characteristic parameter sets may be used to estimate or predict past or future values of each of the plurality of individual speed versus time curves.

The controller 20 also determines a plurality of individual curve confidence values. Each of the plurality of individual curve confidence values corresponds to one of the plurality of individual curve characteristic parameter sets. In the scope of the present disclosure, each of the plurality of individual curve confidence values quantifies how accurately each of the plurality of individual curve characteristic parameter sets describes each of the plurality of individual speed versus time curves. In an exemplary embodiment, the individual curve confidence value is a proportion of the points predicted by the individual curve characteristic parameter set which fall on the individual speed versus time curve. In another exemplary embodiment, the individual curve confidence value is a coefficient of determination ($R^2$) value. It should be understood that the individual curve confidence value may include any value which quantifies how accurately the individual curve characteristic parameter set describes the individual speed versus time curve without departing from the scope of the present disclosure. After block 112, the method 100 proceeds to block 116.

At block 116, the controller 20 merges each of the plurality of individual speed versus time curves determined at block 108 with the fused speed versus time curve determined at block 110 to generate a merged speed versus time curve. In an exemplary embodiment, each of the plurality of individual speed versus time curves and the fused speed versus time curve are merged using a curve merging machine learning algorithm configured to receive the plurality of individual curve characteristic parameter sets, the plurality of individual curve confidence values, the fused curve characteristic parameter set, and the fused curve confidence value as inputs and provide the merged speed versus time curve as an output.

In another exemplary embodiment, each of the plurality of individual speed versus time curves and the fused speed versus time curve are merged using weighted averaging of the plurality of individual curve characteristic parameter sets and the fused curve characteristic parameter set. The weighting is based on the plurality of individual curve confidence values and the fused curve confidence value. It should be understood that the aforementioned embodiments are merely exemplary in nature, and that additional methods for combining, averaging, and/or merging multiple datasets based on characteristic parameters and confidence values of the characteristic parameters are within the scope of the present disclosure. After block 116, the method 100 proceeds to block 118.

At block 118, the controller 20 determines a traffic congestion characteristic parameter set describing the merged speed versus time curve determined at block 116. In the scope of the present disclosure, the traffic congestion characteristic parameter set includes parameter values which characterize the shape of the merged speed versus time curve. In an exemplary embodiment, the merged speed versus time curve is fit using a regression or curve fitting algorithm (e.g., a linear, polynomial, exponential, or logarithmic curve fitting algorithm) which generates the traffic congestion characteristic parameter set. In a non-limiting example, the curve fitting algorithm uses an iterative process to determine optimal values for the traffic congestion characteristic parameter set. In a non-limiting example, the traffic congestion characteristic parameter set includes a maximum speed, a minimum speed, a maximum acceleration, a minimum acceleration, one or more coefficients for a mathematical equation describing a curve fit, and/or the like. The traffic congestion characteristic parameter set may be used to estimate or predict past or future values of the merged speed versus time curve.

The controller 20 also determines a merged curve confidence value of the traffic congestion characteristic parameter set. In the scope of the present disclosure, the merged curve confidence value quantifies how accurately the traffic congestion characteristic parameter set describes the merged speed versus time curve. In an exemplary embodiment, the merged curve confidence value is a proportion of the points predicted by the traffic congestion characteristic parameter set which fall on the merged speed versus time curve. In another exemplary embodiment, the merged curve confidence value is a coefficient of determination ($R^2$) value. It should be understood that the merged curve confidence value may include any value which quantifies how accurately the traffic congestion characteristic parameter set describes the merged speed versus time curve without departing from the scope of the present disclosure. After block 118, the method 100 proceeds to block 120, as will be discussed in greater detail below.

At block 106, the controller 20 uses the one or more perception sensors 32 to perform one or more perception measurements of each of the one or more remote vehicles 16. In an exemplary embodiment, the one or more perception measurements include a speed and position measurement of each of the one or more remote vehicles 16. In a non-limiting example, the controller 20 uses the camera 38 to perform the one or more perception measurements. In a non-limiting example, the controller 20 uses the radar sensor 40 to perform the one or more perception measurements. In a non-limiting example, the controller 20 uses the LiDAR sensor 42 to perform the one or more perception measurements. After block 106, the method 100 proceeds to block 122.

At block 122, the controller 20 determines a plurality of observed individual speed versus time curves. Each of the plurality of observed individual speed versus time curves corresponds to one of the one or more remote vehicles 16. Therefore, each of the plurality of observed individual speed versus time curves includes speed data for one of the one or more remote vehicles 16. In some embodiments, outlier speed data and/or outlier observed individual speed versus time curves are detected and removed from the plurality of observed individual speed versus time curves. In an exemplary embodiment, to determine the plurality of observed individual speed versus time curves, the controller 20 aggregates the speed versus time data from the one or more perception measurements performed at block 106 for each of the one or more remote vehicles 16. After block 122, the method 100 proceeds to block 124.

At block 124, the controller 20 determines a plurality of observed individual curve characteristic parameter sets. One of the plurality of observed individual curve characteristic parameter sets describes each of the plurality of observed individual speed versus time curves determined at block 122. In the scope of the present disclosure, each individual curve characteristic parameter set includes parameter values which characterize the shape of one of the plurality of observed individual speed versus time curves. In an exemplary embodiment, each of the plurality of observed individual speed versus time curves are fit using a regression or curve fitting algorithm (e.g., a linear, polynomial, exponential, or logarithmic curve fitting algorithm) which generates an observed individual curve characteristic parameter set. In a non-limiting example, the curve fitting algorithm uses an iterative process to determine optimal values for each of the plurality of observed individual curve characteristic parameter sets. In a non-limiting example, each of the plurality of observed individual curve characteristic parameter sets include a maximum speed, a minimum speed, a maximum acceleration, a minimum acceleration, one or more coefficients for a mathematical equation describing a curve fit, and/or the like. The plurality of observed individual curve characteristic parameter sets may be used to estimate or predict past or future values of each of the plurality of observed individual speed versus time curves.

The controller 20 also determines a plurality of observed individual curve confidence values. Each of the plurality of observed individual curve confidence values corresponds to one of the plurality of observed individual curve characteristic parameter sets. In the scope of the present disclosure, each of the plurality of observed individual curve confidence values quantifies how accurately each of the plurality of observed individual curve characteristic parameter sets describes each of the plurality of observed individual speed versus time curves. In an exemplary embodiment, the observed individual curve confidence value is a proportion of the points predicted by the observed individual curve characteristic parameter set which fall on the observed individual speed versus time curve. In another exemplary embodiment, the observed individual curve confidence value is a coefficient of determination ($R^2$) value. It should be understood that the observed individual curve confidence value may include any value which quantifies how accurately the observed individual curve characteristic parameter set describes the observed individual speed versus time curve without departing from the scope of the present disclosure. After block 124, the method 100 proceeds to block 120.

At block 120, the controller 20 determines a traffic congestion type. In the scope of the present disclosure, the traffic congestion type categorizes traffic congestion occurring on the roadway 14 into one or more predefined categories. In an exemplary embodiment, the traffic congestion type includes one of three predefined traffic congestion types which may commonly occur.

Figure 4A:
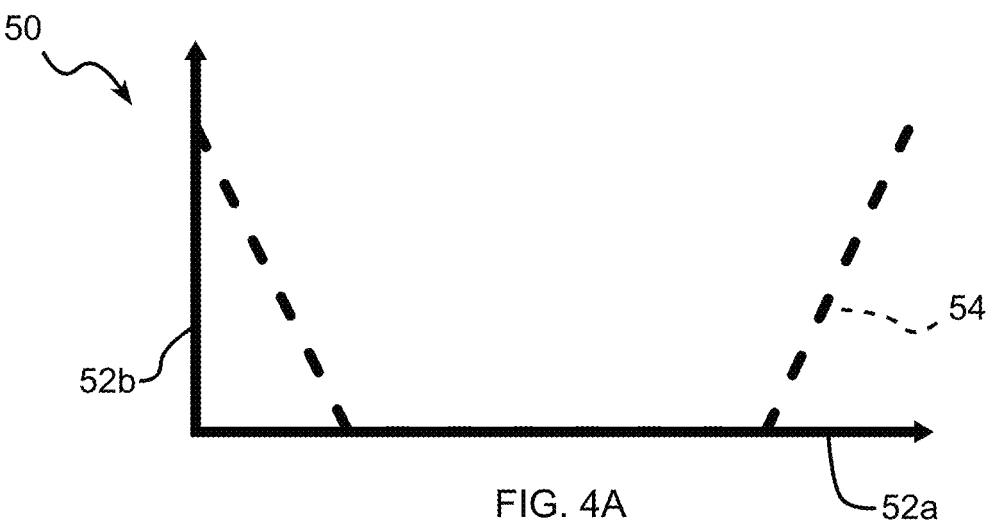
FIG. 4A is a first exemplary speed versus time graph illustrating a first traffic congestion type, according to an exemplary embodiment.

Referring to FIG. 4A, a first exemplary speed versus time graph 50 illustrating a first traffic congestion type is shown. The first exemplary speed versus time graph 50 includes a horizontal axis 52a depicting time (e.g., in units of minutes), a vertical axis 52b depicting speed (e.g., in units of kilometers per hour), and a first exemplary speed versus time curve 54. The first traffic congestion type having the first exemplary speed versus time curve 54 is characteristic of a long queue at a congested intersection, resulting in relatively long waiting periods with no movement separated by relatively long periods of rapid acceleration and deceleration.

Figure 4B:
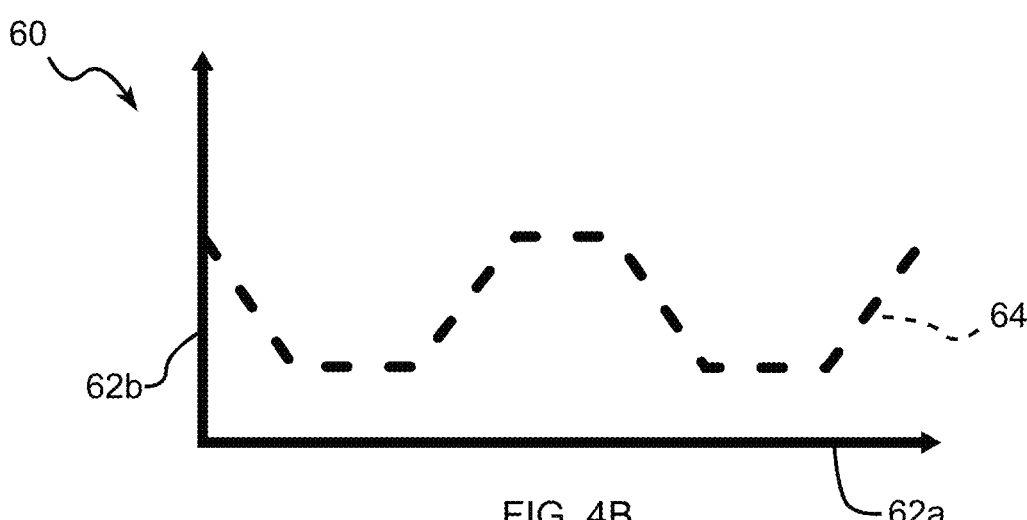
FIG. 4B is a second exemplary speed versus time graph illustrating a second traffic congestion type, according to an exemplary embodiment.

Referring to FIG. 4B, a second exemplary speed versus time graph 60 illustrating a second traffic congestion type is shown. The second exemplary speed versus time graph 60 includes a horizontal axis 62a depicting time (e.g., in units of minutes), a vertical axis 62b depicting speed (e.g., in units of kilometers per hour), and a second exemplary speed versus time curve 64. The second traffic congestion type having the second exemplary speed versus time curve 64 is characteristic of a lane closure (e.g., due to road work, a motor vehicle accident, and/or the like) resulting in quasi-continuous movement with a non-zero minimum speed and relatively short periods of speed fluctuation (e.g., to allow other vehicles to merge into the open lane(s)).

Figure 4C:
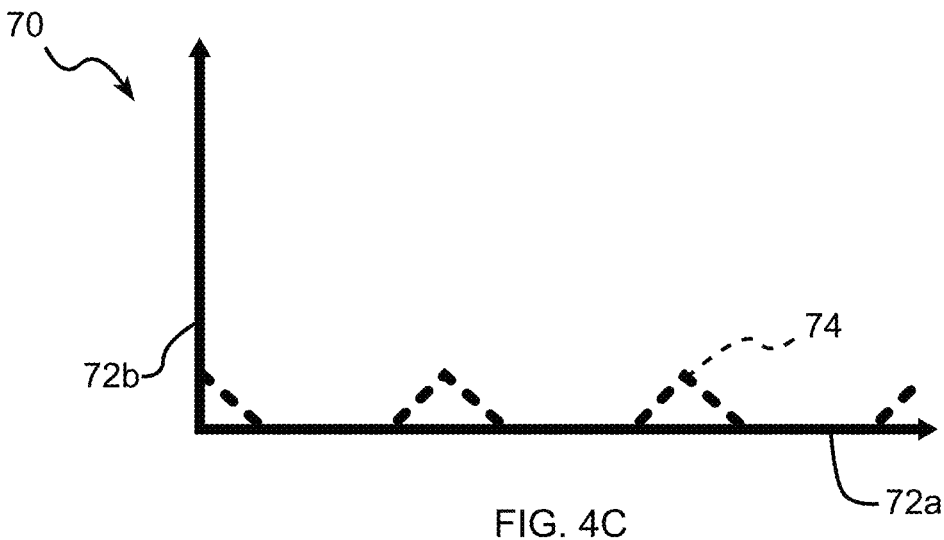
FIG. 4C is a third exemplary speed versus time graph illustrating a third traffic congestion type, according to an exemplary embodiment.

Referring to FIG. 4C, a third exemplary speed versus time graph 70 illustrating a third traffic congestion type is shown. The third exemplary speed versus time graph 70 includes a horizontal axis 72a depicting time (e.g., in units of minutes), a vertical axis 72b depicting speed (e.g., in units of kilometers per hour), and a third exemplary speed versus time curve 74. The third traffic congestion type having the third exemplary speed versus time curve 74 is characteristic of a slow, intermittently moving queue (e.g., caused by a toll booth or other checkpoint), resulting in relatively short waiting periods with no movement separated by relatively short periods of acceleration and deceleration with a relatively low maximum speed.

It should be understood that the first, second, and third traffic congestion types depicted in FIGS. 4A-4C and described above are merely exemplary in nature. Any number of additional traffic congestion types may be considered in the method 100 without departing from the scope of the present disclosure.

Referring again to FIG. 3, in an exemplary embodiment, to determine the traffic congestion type at block 120, the controller 20 analyzes the merged speed versus time curve generated at block 116 and the traffic congestion characteristic parameter set determined at block 118. In a non-limiting example, the controller 20 uses mathematical and/or statistical methods (e.g., root mean square error, coefficient of determination, and/or the like) to compare the merged speed versus time curve with the exemplary speed versus time curves (e.g., the first exemplary speed versus time curve 54, the second exemplary speed versus time curve 64, and the third exemplary speed versus time curve 74) of each of the predefined traffic congestion types (e.g., the first, second, and third traffic congestion types) taking into account the congestion characteristic parameter set. The traffic congestion type is determined to be the one of the predefined traffic congestion types which most closely matches with the merged speed versus time curve. In another non-limiting example, the controller 20 uses a traffic congestion type machine learning algorithm to determine the traffic congestion type.

In a non-limiting example, the traffic congestion type machine learning algorithm includes multiple layers, including an input layer and an output layer, as well as one or more hidden layers. The input layer receives the exemplary speed versus time curves of each of the predefined traffic congestion types (e.g., the first exemplary speed versus time curve 54, the second exemplary speed versus time curve 64, and the third exemplary speed versus time curve 74), the merged speed versus time curve, and the congestion characteristic parameter set as inputs. The inputs are then passed on to the hidden layers. Each hidden layer applies a transformation (e.g., a non-linear transformation) to the data and passes the result to the next hidden layer until the final hidden layer. The output layer produces the traffic congestion type.

To train the traffic congestion type machine learning algorithm, a dataset of inputs and their corresponding traffic congestion type is used. The algorithm is trained by adjusting internal weights between nodes in each hidden layer to minimize prediction error. During training, an optimization technique (e.g., gradient descent) is used to adjust the internal weights to reduce the prediction error. The training process is repeated with the entire dataset until the prediction error is minimized, and the resulting trained model is then used to classify new input data.

After sufficient training of the traffic congestion type machine learning algorithm, the algorithm is capable of accurately and precisely determining traffic congestion type based on the exemplary speed versus time curves of each of the predefined traffic congestion types, the merged speed versus time curve, and the congestion characteristic parameter set. By adjusting the weights between the nodes in each hidden layer during training, the algorithm "learns" to recognize patterns in the data that are indicative of the traffic congestion type.

It should be understood that any mathematical, statistical, rule based, and/or machine learning based algorithm or method may be used to identify which of the predefined traffic congestion types most closely resembles the merged speed versus time curve. It should further be understood that speed versus time data collected during driving sessions of the host vehicle 12 may be used for incremental and/or continued training of the traffic congestion type machine learning algorithm.

In an exemplary embodiment, the controller 20 additionally verifies the traffic congestion type based at least in part on the one or more perception measurements performed at block 106. In an exemplary embodiment, the controller 20 determines an observed traffic congestion type based on the plurality of observed speed versus time curves generated at block 122 and the plurality of observed individual curve characteristic parameter sets determined at block 124. In a non-limiting example, the controller 20 merges the plurality of observed speed versus time curves and the plurality of observed individual curve characteristic parameter sets as discussed in reference to block 116 above to generate a merged observed speed versus time curve and an observed congestion characteristic parameter set.

The controller 20 then uses mathematical, statistical, or machine learning methods, as discussed above, to determine an observed traffic congestion type. The controller 20 then compares the observed traffic congestion type to the traffic congestion type determined as discussed above. In an exemplary embodiment, if the observed traffic congestion type differs from the traffic congestion type, the method 100 is terminated or restarted. In another exemplary embodiment, if the observed traffic congestion type differs from the traffic congestion type, the observed traffic congestion type is taken as the accurate traffic congestion type. After block 120, the method 100 proceeds to blocks 126 and 128.

At block 126, the controller 20 selects a selected machine learning maneuvering model from a plurality of maneuvering models. In the scope of the present disclosure, the plurality of maneuvering models are used to determine an optimal vehicle maneuvering plan for the host vehicle 12. In the scope of the present disclosure, the optimal vehicle maneuvering plan is a plan for maneuvering the host vehicle 12 which maximizes occupant comfort and forward progress of the host vehicle 12 while also minimizing traffic congestion. The optimal vehicle maneuvering plan includes an optimal speed versus time curve which should be followed by the host vehicle 12 to achieve the goals of the optimal vehicle maneuvering plan. The optimal vehicle maneuvering plan further includes one or more optimal acceleration and braking levels, determined based on the optimal speed versus time curve, which should be used by the host vehicle 12 to follow the optimal speed versus time curve.

In an exemplary embodiment, each of the plurality of maneuvering models corresponds to one of the predefined traffic congestion types (e.g., first, second, and third traffic congestion types). Each of the plurality of maneuvering models is a machine learning model which has been trained to determine the optimal vehicle maneuvering plan when the host vehicle 12 is experiencing one of the predefined traffic congestion types (e.g., first, second, and third traffic congestion types).

In a non-limiting example, each of the plurality of maneuvering models are trained using experimental data gathered from real-world, on-road experiments and/or simulated data gathered from computer simulated driving situations. It should further be understood that speed versus time data collected during driving sessions of the host vehicle 12 may be used for incremental and/or continued training of each of the plurality of maneuvering models. At block 126, the controller 20 selects the one of the plurality of maneuvering models which corresponds to the traffic congestion type determined at block 120, referred to as the selected machine learning maneuvering model. After block 126, the method 100 proceeds to block 130.

At block 130, the controller 20 determines the optimal vehicle maneuvering plan using the selected machine learning maneuvering model selected at block 126. In a non-limiting example, the selected machine learning maneuvering model includes multiple layers, including an input layer and an output layer, as well as one or more hidden layers. The input layer receives the traffic congestion characteristic parameter set (determined at block 118) as inputs. The inputs are then passed on to the hidden layers. Each hidden layer applies a transformation (e.g., a non-linear transformation) to the data and passes the result to the next hidden layer until the final hidden layer. The output layer produces the optimal vehicle maneuvering plan including the optimal speed versus time curve and the one or more optimal acceleration and braking levels.

To train the selected machine learning maneuvering model, a dataset of inputs and their corresponding optimal vehicle maneuvering plan including the optimal speed versus time curve and the one or more optimal acceleration and braking levels is used. The algorithm is trained by adjusting internal weights between nodes in each hidden layer to minimize prediction error. During training, an optimization technique (e.g., gradient descent) is used to adjust the internal weights to reduce the prediction error. The training process is repeated with the entire dataset until the prediction error is minimized, and the resulting trained model is then used to classify new input data.

After sufficient training of the selected machine learning maneuvering model, the algorithm is capable of accurately and precisely determining the optimal vehicle maneuvering plan including the optimal speed versus time curve and the one or more optimal acceleration and braking levels based on the traffic congestion characteristic parameter set. By adjusting the weights between the nodes in each hidden layer during training, the algorithm "learns" to recognize patterns in the data that are indicative of the optimal vehicle maneuvering plan including the optimal speed versus time curve and the one or more optimal acceleration and braking levels. After block 130, the method 100 proceeds to block 132, as will be discussed in greater detail below.

At block 128, the controller 20 determines a recommended vehicle maneuver based at least in part on the traffic congestion type determined at block 120. In the scope of the present disclosure, the recommended vehicle maneuver is a rule based, predefined action which is intended to increase occupant comfort or promote efficient forward progress of the host vehicle 12. In a non-limiting example, for the first traffic congestion type, the recommended vehicle maneuver includes maneuvering the host vehicle 12 to a lane with a shortest or fastest queue. For the second traffic congestion type, the recommended vehicle maneuver includes maneuvering the host vehicle 12 to a lane with a higher minimum speed or higher maximum speed.

For the third traffic congestion type, the recommended vehicle maneuver includes maneuvering the host vehicle 12 such as to deter the one or more remote vehicles 16 from queue jumping (i.e., skipping ahead of their original place in the queue by passing vehicles). In a non-limiting example, queue jumping deterrence may include reducing a following distance between the host vehicle 12 and one of the one or more remote vehicles 16 directly ahead of the host vehicle 12. In another non-limiting example, queue jumping deterrence may include maneuvering the host vehicle 12 close to a left or right lane edge such as to deter the one or more remote vehicles 16 from passing the host vehicle 12.

It should be understood that the recommended vehicle maneuvers mentioned above are merely exemplary in nature, and that various additional maneuvers, including, for example, non-deterministic maneuvers and/or maneuvers provided by a machine learning algorithm, may be selected based on the traffic congestion type. It should also be understood that in some cases, no recommended vehicle maneuver is selected. After block 128, the method proceeds to block 132.

At block 132, the controller 20 provides a notification to the occupant of the host vehicle 12 based at least in part on the optimal vehicle maneuvering plan determined at block 130 and the recommended vehicle maneuver determined at block 128. In an exemplary embodiment, the controller 20 uses either one or both of the HMI 24 and/or the HUD 26 to provide the notification. In a non-limiting example, the notification includes text and/or graphics indicating one or more of: the optimal speed versus time curve determined at block 130, the one or more optimal acceleration and braking levels determined at block 130, and the recommended vehicle maneuver determined at block 128.

Figure 5:
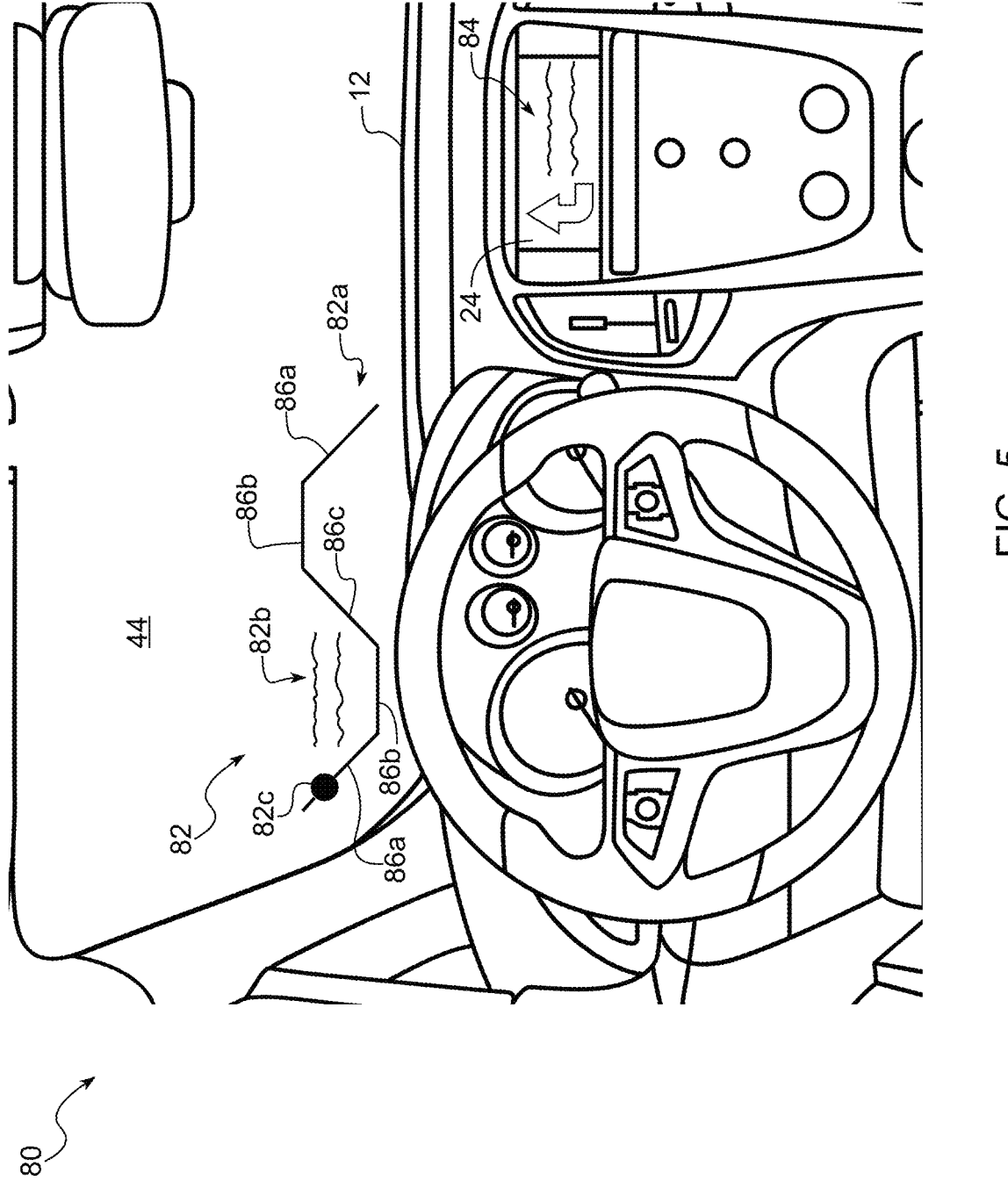
FIG. 5 is an exemplary view from an interior of the vehicle including an exemplary HUD notification and an exemplary HMI notification, according to an exemplary embodiment.

Referring to FIG. 5, an exemplary view 80 from an interior of the host vehicle 12 is shown. The exemplary view 80 includes an exemplary HUD notification 82 displayed on the windscreen 44 using the HUD 26 (FIG. 1) and an exemplary HMI notification 84 displayed on the HMI 24. The exemplary HUD notification 82 includes a graphical depiction 82a of the optimal speed versus time curve, informational text 82b, and a current time indicator 82c.

The graphical depiction 82a of the optimal speed versus time curve includes downward sloping lines 86a, flat lines 86b, and upward sloping lines 86c. The downward sloping lines 86a indicate a reduction in vehicle speed and that the optimal acceleration and braking level is a slight braking level to provide gradual deceleration. The flat lines 86b indicate a constant vehicle speed (greater than or equal to zero) and that the optimal acceleration and braking level is no acceleration or braking action. The upward sloping lines 86c indicate an increase in vehicle speed and that the optimal acceleration and braking level is a slight acceleration level to provide gradual acceleration. In some embodiments, the downward sloping lines 86a, flat lines 86b, and upward sloping lines 86c are highlighted in different colors or graphical styles. In some embodiments, the downward sloping lines 86a, flat lines 86b, and upward sloping lines 86c further include text providing additional explanation.

The informational text 82b provides additional information to the occupant about the optimal speed versus time curve, the one or more optimal acceleration and braking levels, and/or the recommended vehicle maneuver. In an exemplary embodiment, the informational text 82b includes information about the current optimal acceleration and braking level (e.g., "slight braking" or "slight acceleration"). In another exemplary embodiment, the informational text 82b includes information about the traffic congestion type. In another exemplary embodiment, the informational text 82b includes information about the recommended vehicle maneuver (e.g., "merge into left lane when safe").

The current time indicator 82c indicates where the host vehicle 12 currently is along the graphical depiction 82a of the optimal speed versus time curve. In an exemplary embodiment, as time progresses, the current time indicator 82c moves along the graphical depiction 82a of the optimal speed versus time curve (e.g., from left to right), thus indicating the optimal vehicle speed and the current optimal acceleration and braking level at any given time.

The exemplary HMI notification 84 includes graphics and/or text which provide information about the optimal speed versus time curve, the one or more optimal acceleration and braking levels, and/or the recommended vehicle maneuver. In an exemplary embodiment, the exemplary HMI notification 84 is substantially similar or identical to the exemplary HUD notification 82. In another exemplary embodiment, the exemplary HMI notification 84 includes additional information about the optimal speed versus time curve, the one or more optimal acceleration and braking levels, and/or the recommended vehicle maneuver which is not shown in the exemplary HUD notification 82. For example, if the informational text 82b of the exemplary HUD notification 82 includes the current optimal acceleration and braking level, the exemplary HMI notification 84 may include information about the recommended vehicle maneuver. If the HUD 26 is inoperative or unavailable, the exemplary HMI notification 84 may be used to provide information about the optimal speed versus time curve, the one or more optimal acceleration and braking levels, and/or the recommended vehicle maneuver to the occupant of the host vehicle 12.

It should be understood that the foregoing discussion regarding the exemplary view 80, the exemplary HUD notification 82, and the exemplary HMI notification 84 is merely exemplary in nature. The exemplary HUD notification 82 and the exemplary HMI notification 84 shown in FIG. 5 are merely exemplary in nature, and variations in size, shape, color, opacity, location of display, graphical style, and/or the like are within the scope of the present disclosure.

Referring again to FIG. 3, at block 132, the controller 20 provides the notification to the occupant of the host vehicle 12 (e.g., the exemplary HUD notification 82 and/or the exemplary HMI notification 84 as discussed above in reference to FIG. 5). In an exemplary embodiment where the host vehicle 12 is a partially or fully autonomous vehicle, the host vehicle 12 uses an automated driving system (not shown) to follow the one or more optimal acceleration and braking levels, and/or perform the recommended vehicle maneuver. After block 132, the method 100 proceeds to enter a standby state at block 134.

In an exemplary embodiment, the controller 20 repeatedly exits the standby state 134 and restarts the method 100 at block 102. In a non-limiting example, the controller 20 exits the standby state 134 and restarts the method 100 on a timer, for example, every three hundred milliseconds.

The system 10 and method 100 of the present disclosure offer several advantages. By merging the fused speed versus time curve and the plurality of individual speed versus time curves to generate the merged speed versus time curve, the effects of outliers and variations in driver behavior may be minimized, resulting in an accurate characterization of the overall movement trends of the remote vehicles 16 and thus the traffic congestion type. By determining the traffic congestion type, more efficient and accurate machine learning maneuvering models may be used to determine the optimal vehicle maneuvering plan. By displaying the optimal vehicle maneuvering plan using the HMI 24 and/or the HUD 26, the occupants of the host vehicle 12 are informed about automated host vehicle actions and/or informed about optimal actions to increase comfort and forward progress in congested traffic situations.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A method for providing information to an occupant of a vehicle, the method comprising:
   identifying a traffic congestion type in an environment surrounding the vehicle, wherein the traffic congestion type is characterized by a traffic congestion characteristic parameter set, wherein identifying the traffic congestion type further comprises:
      receiving one or more messages from one or more remote vehicles using a vehicle communication system;
      determining a plurality of individual speed versus time curves based at least in part on the one or more messages, wherein each of the plurality of individual speed versus time curves corresponds to one of the one or more remote vehicles; and
      determining the traffic congestion type based at least in part on the plurality of individual speed versus time curves, wherein determining the traffic congestion type based at least in part on the plurality of individual speed versus time curves further comprises:
         determining a plurality of individual curve characteristic parameter sets, wherein one of the plurality of individual curve characteristic parameter sets describes each of the plurality of individual speed versus time curves; and
         determining a plurality of individual curve confidence values, wherein each of the plurality of individual curve confidence values corresponds to one of the plurality of individual curve characteristic parameter sets;
   determining an optimal vehicle maneuvering plan based at least in part on the traffic congestion type and the traffic congestion characteristic parameter set; and
   providing a notification to the occupant of the vehicle, wherein the notification is based at least in part on the optimal vehicle maneuvering plan.

2. The method of claim 1, wherein determining the traffic congestion type based at least in part on the plurality of individual speed versus time curves further comprises:
   fusing each of the plurality of individual speed versus time curves into a fused speed versus time curve;
   determining a fused curve characteristic parameter set describing the fused speed versus time curve; and
   determining a fused curve confidence value of the fused curve characteristic parameter set.

3. The method of claim 2, wherein determining the traffic congestion type based at least in part on the plurality of individual speed versus time curves further comprises:
   merging each of the plurality of individual speed versus time curves with the fused speed versus time curve to generate a merged speed versus time curve, wherein the merged speed versus time curve is generated based at least in part on the plurality of individual curve characteristic parameter sets, the plurality of individual curve confidence values, the fused curve characteristic parameter set, and the fused curve confidence value;
   determining the traffic congestion characteristic parameter set describing the merged speed versus time curve; and determining the traffic congestion type based at least in part on the merged speed versus time curve and the traffic congestion characteristic parameter set.

4. The method of claim 3, wherein determining the traffic congestion type based at least in part on the merged speed versus time curve and the traffic congestion characteristic parameter set further comprises:

performing one or more perception measurements of the one or more remote vehicles using one or more perception sensors of the vehicle; and verifying the traffic congestion type based at least in part on the one or more perception measurements.

5. The method of claim 1, wherein determining the optimal vehicle maneuvering plan further comprises:

selecting a selected machine learning maneuvering model from a plurality of maneuvering models, wherein the selected machine learning maneuvering model corresponds to the traffic congestion type; and determining the optimal vehicle maneuvering plan using the selected machine learning maneuvering model, wherein the selected machine learning maneuvering model is configured to receive the traffic congestion characteristic parameter set as an input and provide the optimal vehicle maneuvering plan as an output.

6. The method of claim 5, wherein determining the optimal vehicle maneuvering plan further comprises:

determining the optimal vehicle maneuvering plan using the selected machine learning maneuvering model, wherein the selected machine learning maneuvering model is configured to receive the traffic congestion characteristic parameter set as an input and provide the optimal vehicle maneuvering plan as an output, and wherein the optimal vehicle maneuvering plan includes an optimal speed versus time curve.

7. The method of claim 6, wherein providing the notification further comprises:

determining one or more optimal acceleration and braking levels based at least in part on the optimal speed versus time curve; and providing the notification to the occupant of the vehicle, wherein the notification includes at least one of: the optimal speed versus time curve and the one or more optimal acceleration and braking levels.

8. The method of claim 1, wherein providing the notification further comprises:

determining a recommended vehicle maneuver based at least in part on the traffic congestion type; and providing the notification to the occupant of the vehicle, wherein the notification includes the recommended vehicle maneuver.

9. A system for providing information to an occupant of a vehicle, the system comprising:

a vehicle communication system;

a display;

a controller in electrical communication with the vehicle communication system and the display, wherein the controller is programmed to:

identify a traffic congestion type in an environment surrounding the vehicle using the vehicle communication system, wherein the traffic congestion type is characterized by a traffic congestion characteristic parameter set, wherein to identify the traffic congestion type, the controller is further programmed to:

receive one or more messages from one or more remote vehicles using the vehicle communication system;

determine a plurality of individual speed versus time curves based at least in part on the one or more messages, wherein each of the plurality of individual speed versus time curves corresponds to one of the one or more remote vehicles; and determine the traffic congestion type based at least in part on the plurality of individual speed versus time curves, wherein to determine the traffic congestion type based at least in part on the plurality of individual speed versus time curves, the controller is further programmed to:

determine a plurality of individual curve characteristic parameter sets, wherein one of the plurality of individual curve characteristic parameter sets describes each of the plurality of individual speed versus time curves;

determine a plurality of individual curve confidence values, wherein each of the plurality of individual curve confidence values corresponds to one of the plurality of individual curve characteristic parameter sets;

fuse each of the plurality of individual speed versus time curves into a fused speed versus time curve;

determine a fused curve characteristic parameter set describing the fused speed versus time curve;

determine a fused curve confidence value of the fused curve characteristic parameter set;

merge each of the plurality of individual speed versus time curves with the fused speed versus time curve to generate a merged speed versus time curve, wherein the merged speed versus time curve is generated based at least in part on the plurality of individual curve characteristic parameter sets, the plurality of individual curve confidence values, the fused curve characteristic parameter set, and the fused curve confidence value;

determine the traffic congestion characteristic parameter set describing the merged speed versus time curve; and determine the traffic congestion type based at least in part on the merged speed versus time curve and the traffic congestion characteristic parameter set;

determine an optimal vehicle maneuvering plan based at least in part on the traffic congestion type and the traffic congestion characteristic parameter set; and provide a notification to the occupant of the vehicle using the display, wherein the notification is based at least in part on the optimal vehicle maneuvering plan.

10. The system of claim 9, further comprising one or more perception sensors in electrical communication with the controller, and wherein to determine the traffic congestion type based at least in part on the merged speed versus time curve and the traffic congestion characteristic parameter set, the controller is further programmed to:

perform one or more perception measurements of the one or more remote vehicles using the one or more perception sensors; and verify the traffic congestion type based at least in part on the one or more perception measurements.

11. The system of claim 10, wherein to determine the optimal vehicle maneuvering plan, the controller is further programmed to:

select a selected machine learning maneuvering model from a plurality of maneuvering models, wherein the selected machine learning maneuvering model corresponds to the traffic congestion type; and determine the optimal vehicle maneuvering plan using the selected machine learning maneuvering model, wherein the selected machine learning maneuvering model is configured to receive the traffic congestion characteristic parameter set as an input and provide the optimal vehicle maneuvering plan as an output, and wherein the optimal vehicle maneuvering plan includes an optimal speed versus time curve.

12. The system of claim 11, wherein to provide the notification, the controller is further programmed to:

determine one or more optimal acceleration and braking levels based at least in part on the optimal speed versus time curve; and provide the notification to the occupant of the vehicle using the display, wherein the notification includes at least one of: the optimal speed versus time curve and the one or more optimal acceleration and braking levels.

13. The system of claim 12, wherein the display further comprises a head-up display (HUD) in electrical communication with the controller, and wherein to provide the notification, the controller is further programmed to:

provide the notification to the occupant of the vehicle using the HUD, wherein the notification includes at least one of: the optimal speed versus time curve and the one or more optimal acceleration and braking levels.

14. A method for providing information to an occupant of a vehicle, the method comprising:

receiving one or more messages from one or more remote vehicles using a vehicle communication system;

determining a plurality of individual speed versus time curves based at least in part on the one or more messages, wherein each of the plurality of individual speed versus time curves corresponds to one of the one or more remote vehicles;

determining a traffic congestion type based at least in part on the plurality of individual speed versus time curves, wherein the traffic congestion type is characterized by a traffic congestion characteristic parameter set, wherein determining the traffic congestion type based at least in part on the plurality of individual speed versus time curves further comprises:

determining a plurality of individual curve characteristic parameter sets, wherein one of the plurality of individual curve characteristic parameter sets describes each of the plurality of individual speed versus time curves;

determining a plurality of individual curve confidence values, wherein each of the plurality of individual curve confidence values corresponds to one of the plurality of individual curve characteristic parameter sets;

fusing each of the plurality of individual speed versus time curves into a fused speed versus time curve;

determining a fused curve characteristic parameter set describing the fused speed versus time curve; and determining a fused curve confidence value of the fused curve characteristic parameter set;

merging each of the plurality of individual speed versus time curves with the fused speed versus time curve to generate a merged speed versus time curve, wherein the merged speed versus time curve is generated based at least in part on the plurality of individual curve characteristic parameter sets, the plurality of individual curve confidence values, the fused curve characteristic parameter set, and the fused curve confidence value;

determining the traffic congestion characteristic parameter set describing the merged speed versus time curve; and determining the traffic congestion type based at least in part on the merged speed versus time curve and the traffic congestion characteristic parameter set;

determining an optimal vehicle maneuvering plan based at least in part on the traffic congestion type and the traffic congestion characteristic parameter set, wherein the optimal vehicle maneuvering plan includes at least an optimal speed versus time curve;

determining one or more optimal acceleration and braking levels based at least in part on the optimal speed versus time curve; and providing a notification to the occupant of the vehicle using a head-up display (HUD), wherein the notification includes at least one of: the optimal speed versus time curve and the one or more optimal acceleration and braking levels.

15. The method of claim 14, wherein determining the optimal vehicle maneuvering plan further comprises:

selecting a selected machine learning maneuvering model from a plurality of maneuvering models, wherein the selected machine learning maneuvering model corresponds to the traffic congestion type; and determining the optimal vehicle maneuvering plan using the selected machine learning maneuvering model, wherein the selected machine learning maneuvering model is configured to receive the traffic congestion characteristic parameter set as an input and provide the optimal vehicle maneuvering plan as an output, and wherein the optimal vehicle maneuvering plan includes an optimal speed versus time curve.

* * * * *